(12) United States Patent
Drabon et al.

(10) Patent No.: US 10,374,270 B2
(45) Date of Patent: Aug. 6, 2019

(54) BATTERY HOLDER WITH COOLING SYSTEM

(71) Applicant: Benteler Automobiltechnik GmbH, Paderborn (DE)

(72) Inventors: Rodscha Drabon, Salzkotten (DE); Florian Kneuper, Paderborn (DE); Marcel Passon, Hoevelhof (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 155 days.

(21) Appl. No.: 15/684,585

(22) Filed: Aug. 23, 2017

(65) Prior Publication Data
US 2018/0062224 A1  Mar. 1, 2018

(30) Foreign Application Priority Data
Aug. 23, 2016 (DE) .................. 10 2016 115 627

(51) Int. Cl.
*H01M 10/625* (2014.01)
*H01M 10/613* (2014.01)
*H01M 2/10* (2006.01)
*H01M 10/615* (2014.01)

(52) U.S. Cl.
CPC ....... *H01M 10/625* (2015.04); *H01M 2/1083* (2013.01); *H01M 2/1088* (2013.01); *H01M 10/613* (2015.04); *H01M 10/615* (2015.04); *H01M 2220/20* (2013.01)

(58) Field of Classification Search
None
See application file for complete search history.

(56) References Cited

U.S. PATENT DOCUMENTS 5,158,841 A   10/1992   Mennicke et al.

FOREIGN PATENT DOCUMENTS

DE        4013269 A1    10/1991
DE   102012012663 A1    12/2013

*Primary Examiner* — Osei K Amponsah
(74) *Attorney, Agent, or Firm* — Hauptman Ham, LLP

(57) ABSTRACT

A battery holder for an electric vehicle is disclosed. The battery holder is mounted in a subfloor region of the electric vehicle and includes a pan and a cover. The pan is formed by an outer encircling frame and a bottom. A cooling system is integrated in the bottom of the pan.

16 Claims, 17 Drawing Sheets

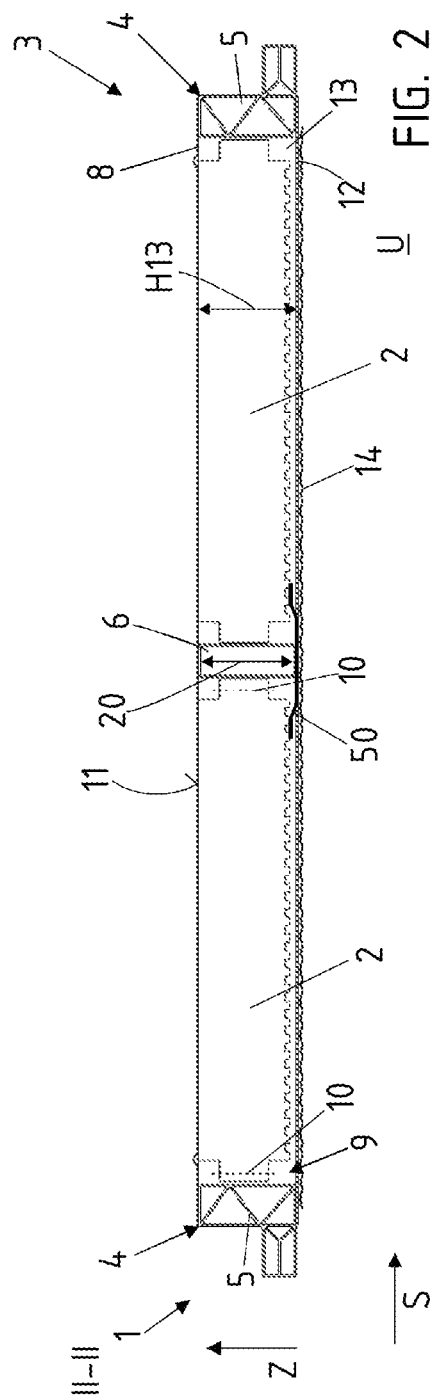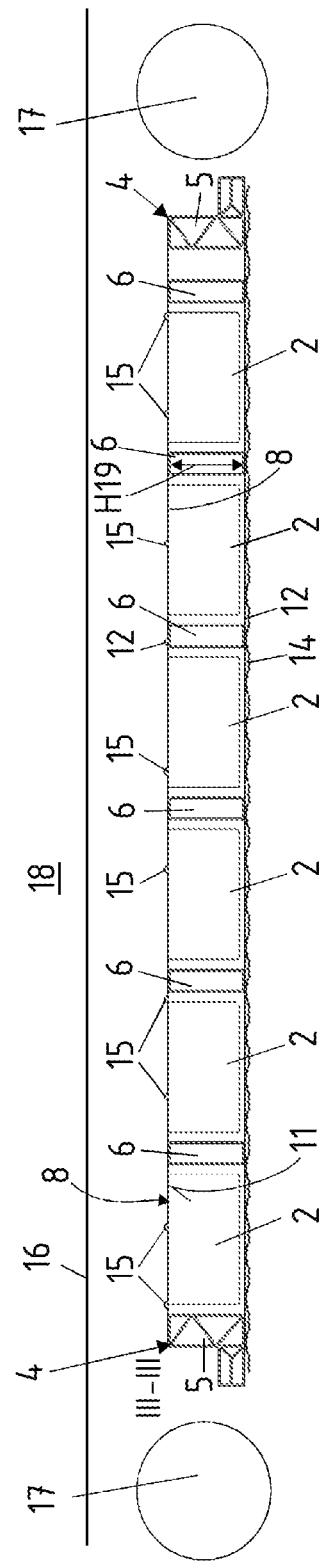

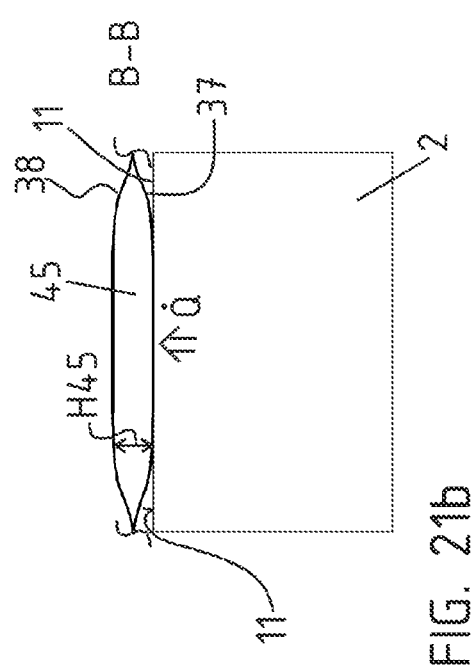

BATTERY HOLDER WITH COOLING SYSTEM

RELATED APPLICATIONS

The present application claims the priority from German Application Number 10 2016 115 627.2, filed Aug. 23, 2016, the disclosure of which is hereby incorporated by reference herein in its entirety.

BACKGROUND

1. Field of the Invention

The disclosure is related to a vehicle component and, more specifically, to a battery holder for an electric vehicle.

2. Description of the Related Art

Motor vehicles are known in the prior art for transporting passengers or freight from one location to another. These motor vehicles have for this purpose a vehicle body to which on the one hand the undercarriage components are attached and which on the other hand comprises at least one drive unit. The drive units used are usually internal combustion engines, which transform the chemical energy contained in the fuel into driving energy. The transformation process is limited by the ideal Carnot process. Thus, at present as much as approx. 40% of the chemical energy contained in the fuel can be transformed into driving energy. The rest of the energy is taken away by friction and waste heat, especially through the exhaust gas. Furthermore, emissions arise on account of the combustion process, which are likewise taken away via the exhaust gas into the surroundings.

Therefore, in recent years electrical mobility has gained increasingly in importance. The drive unit here is an electric motor, which obtains its electrical energy from batteries or even in turn from by means of an electrical generator of an internal combustion engine.

Especially in the case of batteries, progress has been made with the ion technique, which by diminishing the internal resistance makes it possible to charge the series- or parallel-connected cells of the battery in a shorter time than cells with gel- or flux-bound electrolyte, as well as making possible more charging cycles with little power loss and thus longer lifetime of the batteries. Batteries are also called energy stores or storage batteries, or also traction batteries. While in the past lead or steel storage batteries were used, today electrically driven vehicles use nickel/metal hybrids or lithium ion storage batteries, especially lithium-iron-phosphate storage batteries. Such a vehicle shall be called an electric vehicle in the following.

The power output as well as the lifetime of such batteries are temperature-dependent. On the one hand, the power output decreases at low temperatures, especially below 10° C., since the mobility of the charge carriers in the batteries decreases. During operation, and hence during the drawing of power, especially in the case of a large electrical current strength, the batteries become heated. The calendar life of the battery is decreased especially above 30° C. Cooling and/or heating systems for batteries in electric vehicles are therefore known in the prior art.

Unlike a starter battery, drive batteries on account of the required capacity for the energy being stored need relatively large spatial volume in situ and are relatively heavy. The number of batteries needed for the drive, consisting of several cells, may have an overall weight of up to several hundred kilograms. Therefore, the batteries are preferably arranged in the subfloor region of electric vehicles. Especially for purposes of mounting in the motor vehicle, but also for providing a corresponding heating and cooling system, the batteries are accommodated in a battery holder. Such a battery holder is also known as a "battery tray".

The problem which the present invention proposes to solve is to indicate a battery holder which has a simple structural design and at the same time a highly effective cooling system.

SUMMARY

According to one exemplary embodiment, a battery holder for an electric vehicle is disclosed. The battery holder is mounted in a subfloor region of the electric vehicle and includes a pan to receive at least one battery and a cover with which the pan is closed. The pan is formed by an outer encircling frame and a bottom, and further includes a cooling system which is integrated in the bottom of the pan, and more specifically arranged in a double-layer bottom of the pan between two bottom layers. The cooling system is preferably formed by cooling ducts and optional latent heat storages. The cooling ducts are formed between the bottom layers by form-fitting, fluid-tight coupling of the bottom layers.

The outer encircling frame is formed from a hollow profile, especially from a multichambered hollow profile. Preferably, at least one transverse web and at least one longitudinal web are arranged in the frame. The at least one transverse web and the at least one longitudinal web form receiving spaces to receive the at least one battery. The at least one battery is then installed in the receiving spaces in particular such that it is coupled in sheetlike manner and preferably standing in the receiving spaces under a bias force against the webs. Preferably the coupling occurs by screws. The heat produced in each battery can thus be transferred across the battery bottom to the bottom of the pan by thermal conduction. Hence, a thermal conduction occurs from the battery bottom to the bottom of the pan. The heat can then be taken away by the cooling system. The battery is preferably mounted such that it is pressed against the bottom with a surface pressure. This improves the thermal conduction from the battery bottom to the bottom.

The bottom is double-layered in particular, the cooling system is arranged between the two bottom layers. The bottom is preferably formed from several layers as a "sandwich" structure. An inner bottom layer, hence the bottom layer against which the battery bottom lies, is preferably made from a metal alloy, and more specifically from a light metal alloy or an aluminum alloy. Preferably, the inner bottom layer has a wall thickness less than 1.5 mm. This enables an especially good thermal conduction from the battery bottom across the inner bottom layer to the cooling system.

Moreover, the cooling ducts are formed between the two bottom layers to carry a cooling agent. In particular, the cooling ducts are formed by the bottom layer itself. At least one bottom layer has a three-dimensional profiling, so that a duct system is formed by the form-fitting placement against the second bottom layer. The bottom layers may then be coupled to each other in integrally bonded and/or form-fitting manner, in particular, the bottom layers are joined together by adhesive and/or screws. The bottom layers in particular are coupled together fluid-tight at the coupling sites or bearing sites, so that a cooling agent such as a heat transfer fluid can flow through the cooling ducts.

In one exemplary embodiment, the two bottom layers may be formed from a metallic material, especially from a light metal alloy. It is also conceivable for at least one bottom layer to be formed from a steel alloy. Preferably, the inner bottom layer is sheetlike, so that the batteries bear against it in sheetlike manner here. The outer bottom layer is especially preferably profiled, so that in this way the cooling duct system is produced in conjunction with the bearing against the inner bottom layer between the two bottom layers. A bottom layer can also be formed from a fiber composite and/or a plastic material. Preferably, this is the outer bottom layer. In particular, the outer bottom layer may have turbulence elements, which are arranged inside the cooling system. The turbulence elements are preferably integrated in the outer bottom layer and made of the same material as it. The outer bottom layer is the second bottom layer.

In another exemplary embodiment, latent heat storages are arranged in the bottom. The latent heat storages themselves are preferably sheetlike in form. Furthermore, the latent heat storages are arranged between the bottom layers and also between the cooling ducts. The latent heat storages provide the advantage that the heat from the batteries installed in the battery holder continues to be taken up in the latent heat storages in the event of failure of the cooling system and/or turning off the motor vehicle and/or switching off the cooling system, such as when the electric vehicle is parked. Thus, an at least passive cooling of the at least one battery continues to occur, even when the active cooling system is no longer cooling it. Thus, a cooling is still provided for a certain time during parking and/or in the event of failure of the active cooling system.

Another benefit of the latent heat storage is that heat which was placed in the heat storage during operation can be given off to the battery installed in the battery holder from the latent heat storage. This is advantageous, for example, at low or very high outside temperatures. The at least one battery is thus maintained longer at an optimal operating temperature. On the whole, this affords the benefit that each of the batteries has better performance as well as a longer lifetime expectation.

Advantageously, in the case of a double-layered bottom, a thermal conduction layer such as one in the form of a thermal conduction paste is furthermore arranged on an inner face of the bottom and the battery bottom. This, in addition or alternatively to the surface pressure, improves the thermal conduction from the battery to the bottom, or the cooling system.

Moreover, according to an exemplary embodiment, a method for operating the cooling system of the battery holder is disclosed. An inner bottom layer, hence the first bottom layer, which lies against the battery bottom at least for a portion, is made of a thin-walled metal sheet. Thus, when the cooling system is subjected to an excess pressure, an outward expansion of the first bottom layer occurs, in particular, in the direction of the battery bottom. Thus, the first bottom layer lies even more strongly against the battery bottom and improves the thermal conduction from the battery to the cooling system.

Given a wall thickness of a first bottom layer of light metal less than or equal to around 0.5 mm and a width of the cooling duct located above it of around 50 mm, an operating pressure of greater than or equal to 4 bar is preferably provided in the cooling duct, so that the first bottom layer arches or presses in the direction of the battery bottom. For a width of the cooling duct of around 100 mm, an operating pressure greater than or equal to 2 bar is preferred, and for 20 mm an operating pressure greater than 10 bar is preferred. Here as well, the first bottom layer in each case will arch or press in the direction of the battery bottom and thus improve the thermal conduction. The operating pressure should not exceed 20 bar.

BRIEF DESCRIPTION OF THE DRAWINGS

For an understanding of embodiments of the disclosure, reference is now made to the following description taken in conjunction with the accompanying drawings, in which:

FIG. 2 is a cross sectional view taken along line II-II of FIG. 1, but rotated by 180 degrees;

FIG. 3 is a longitudinal sectional view taken along line of FIG. 1, likewise rotated by 180 degrees;

Figure 5:
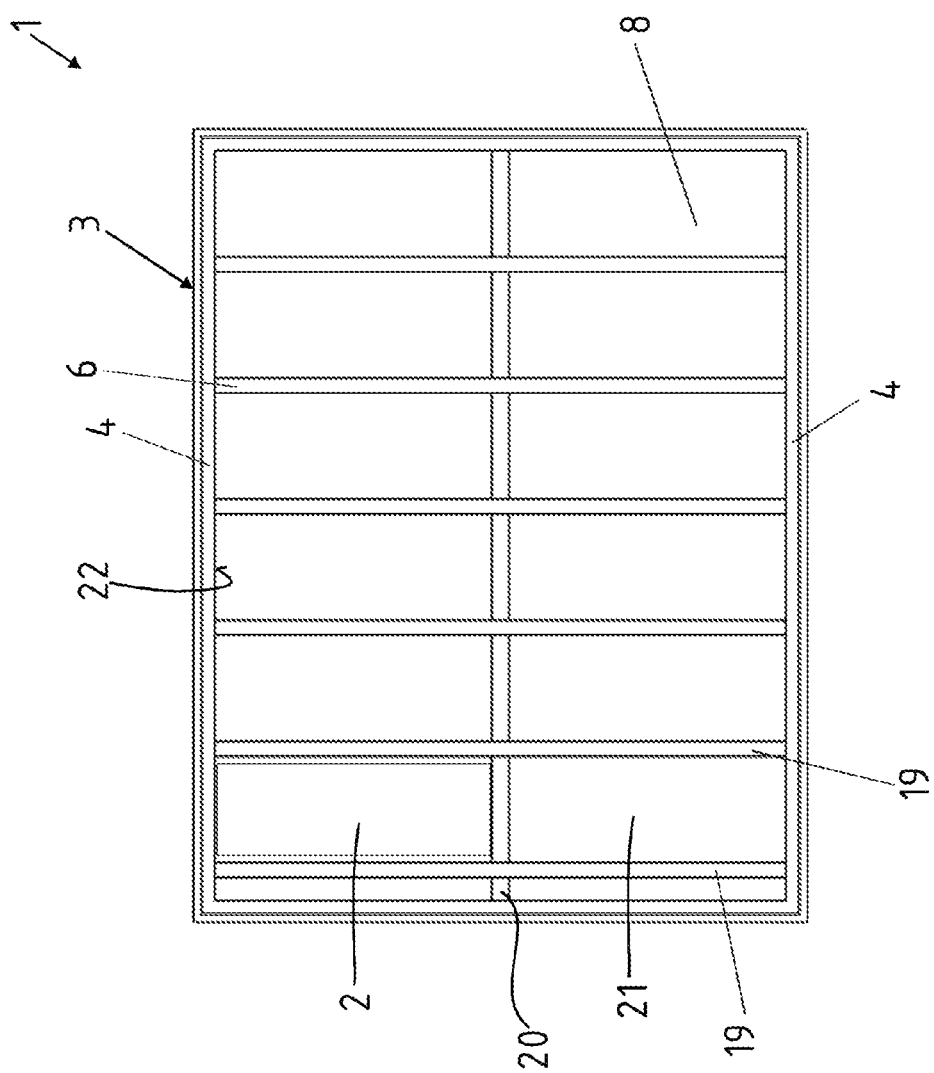
Figure 6:
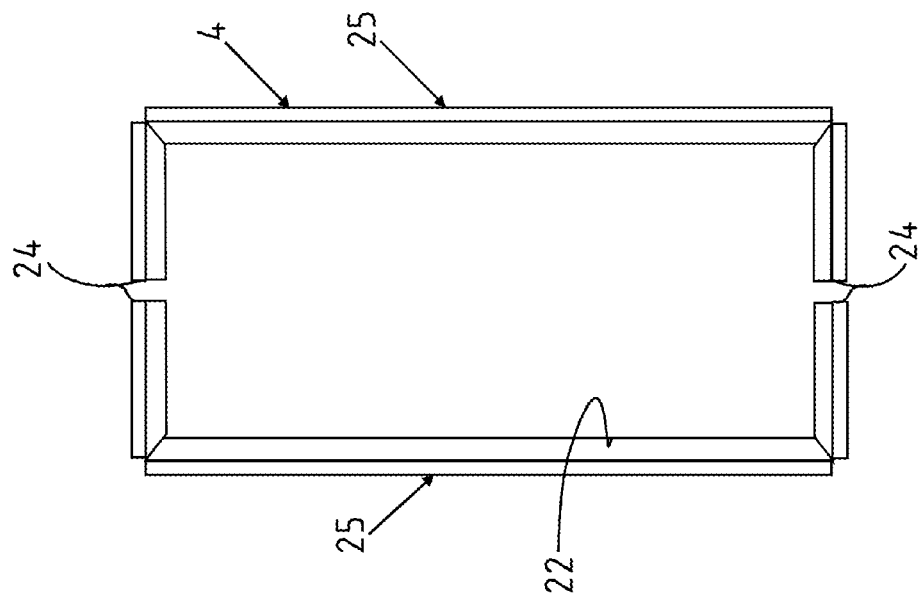
Figure 7:
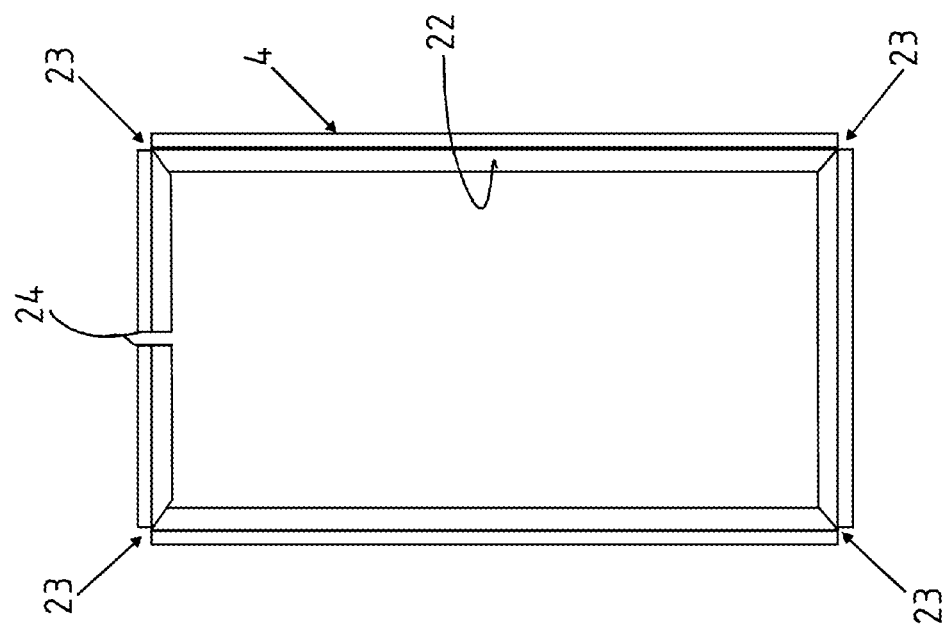
Figure 10:
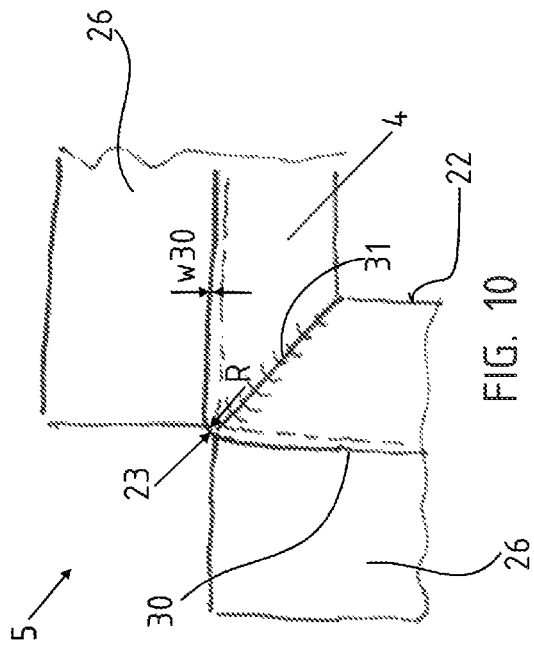
Figure 8:
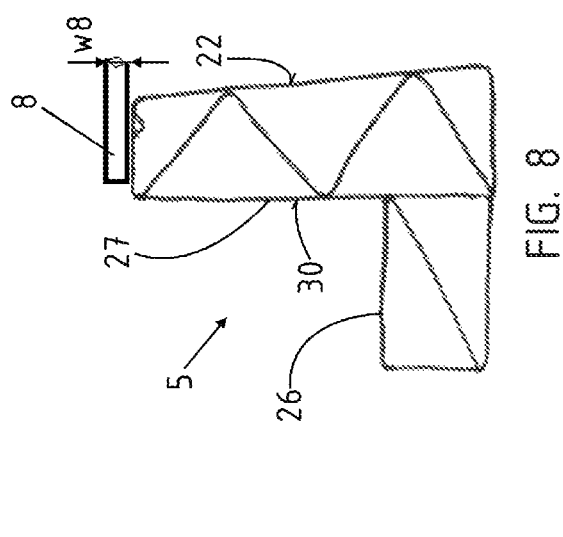
Figure 9:
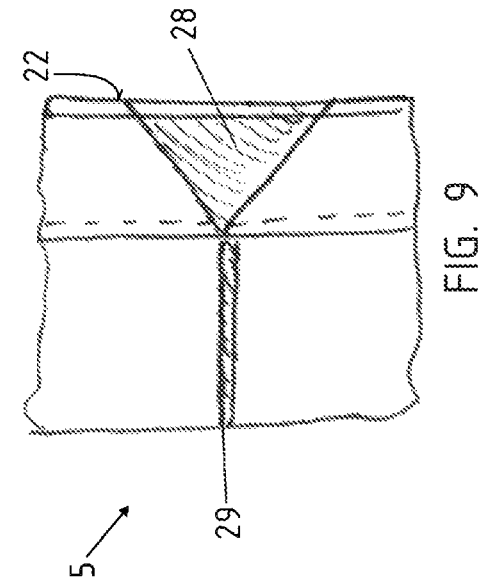
Figure 11:
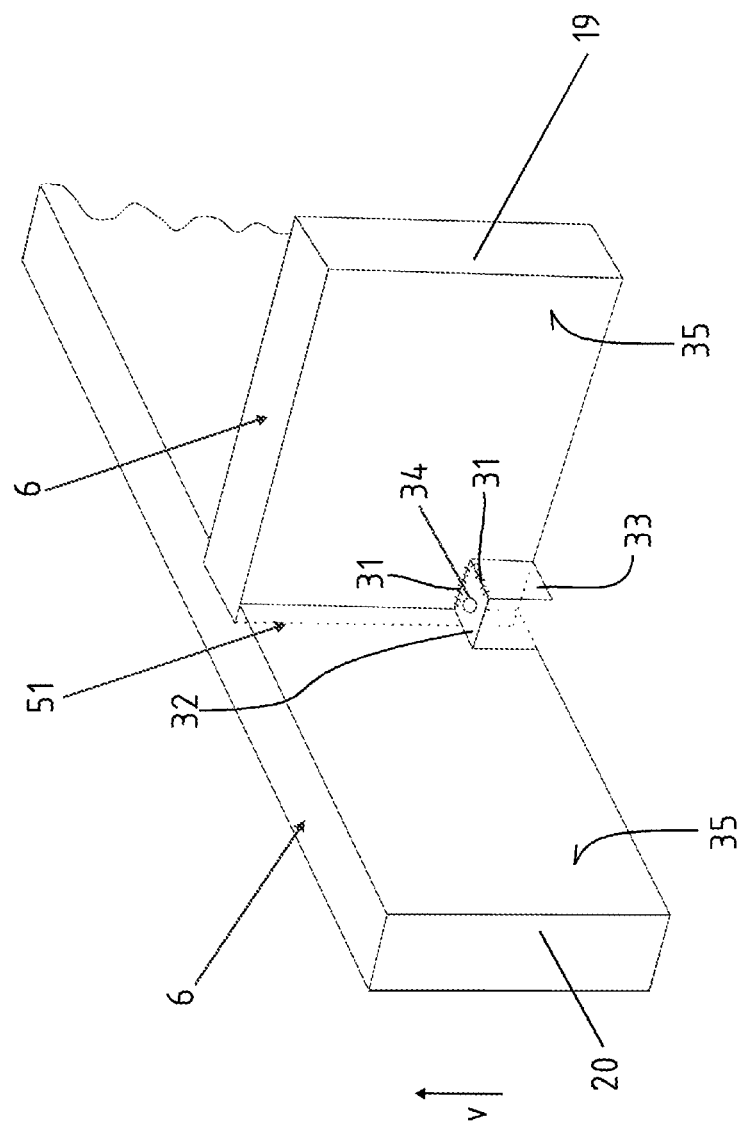
Figure 12:
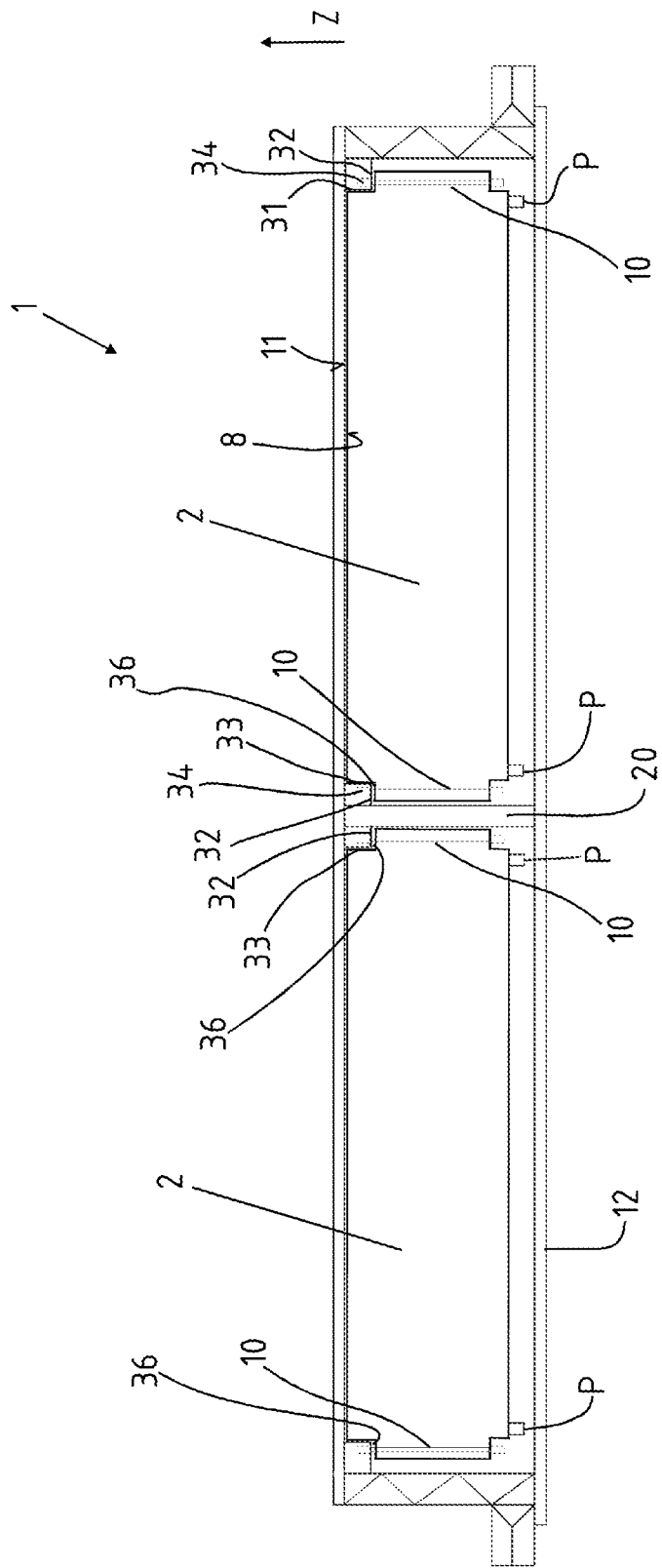
Figure 13:
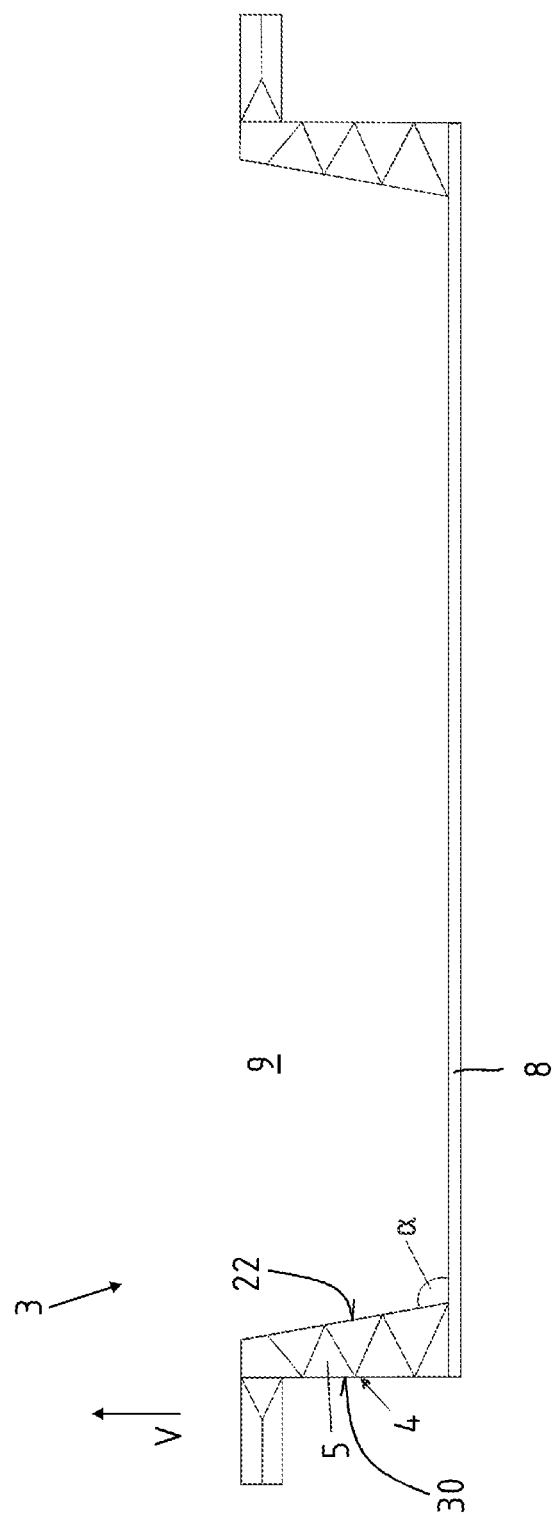
Figure 14:
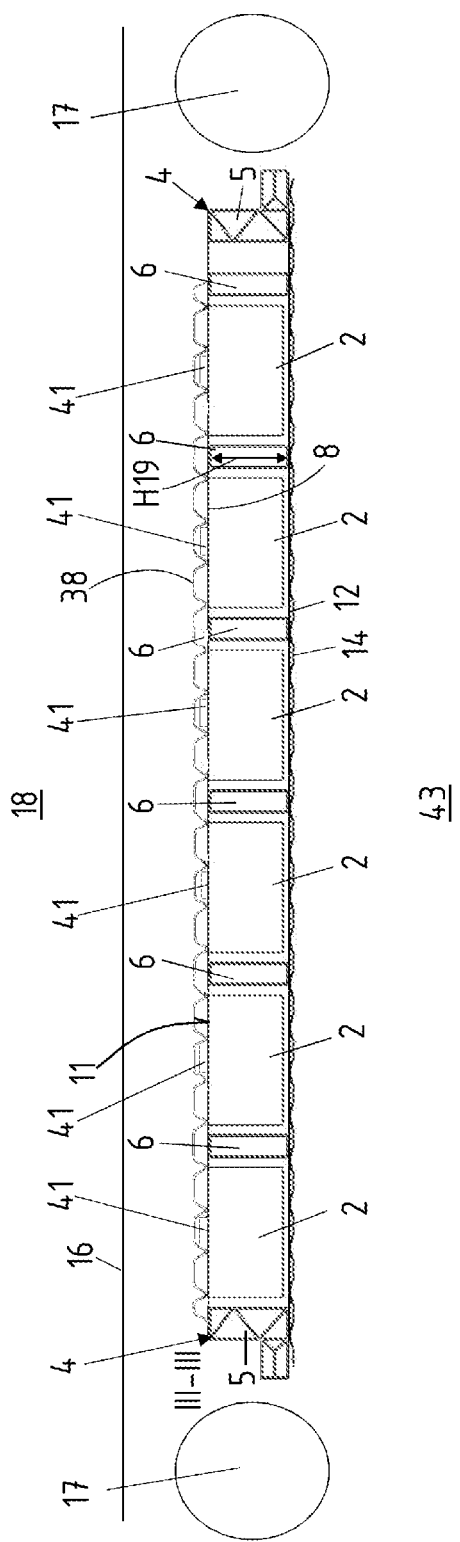
Figure 15:
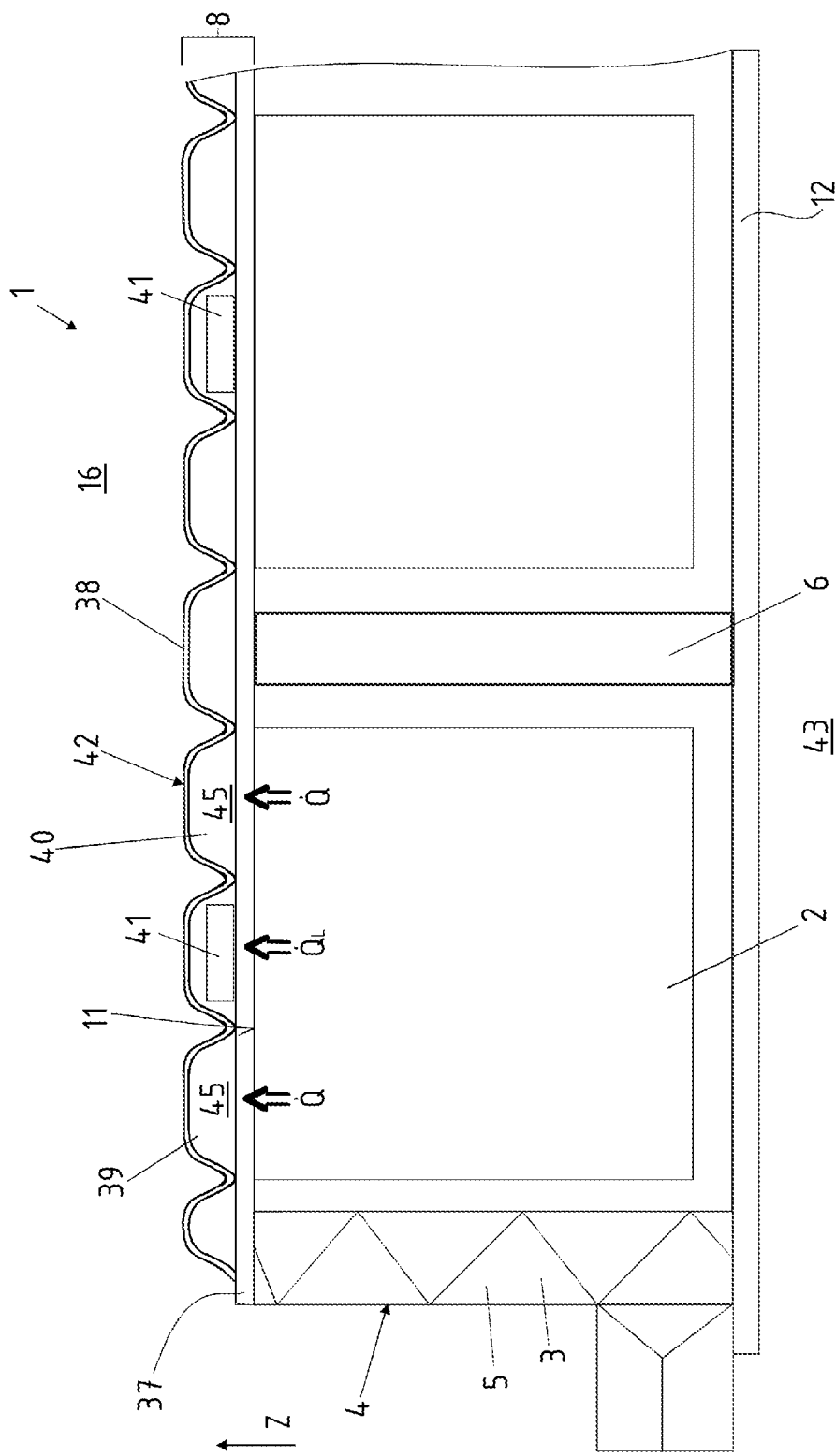
Figure 16:
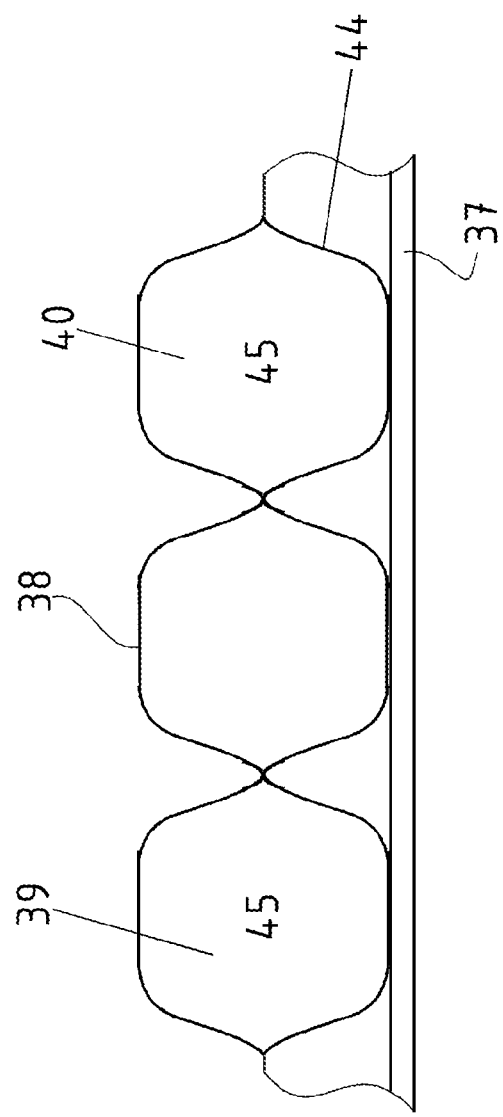
Figure 17:
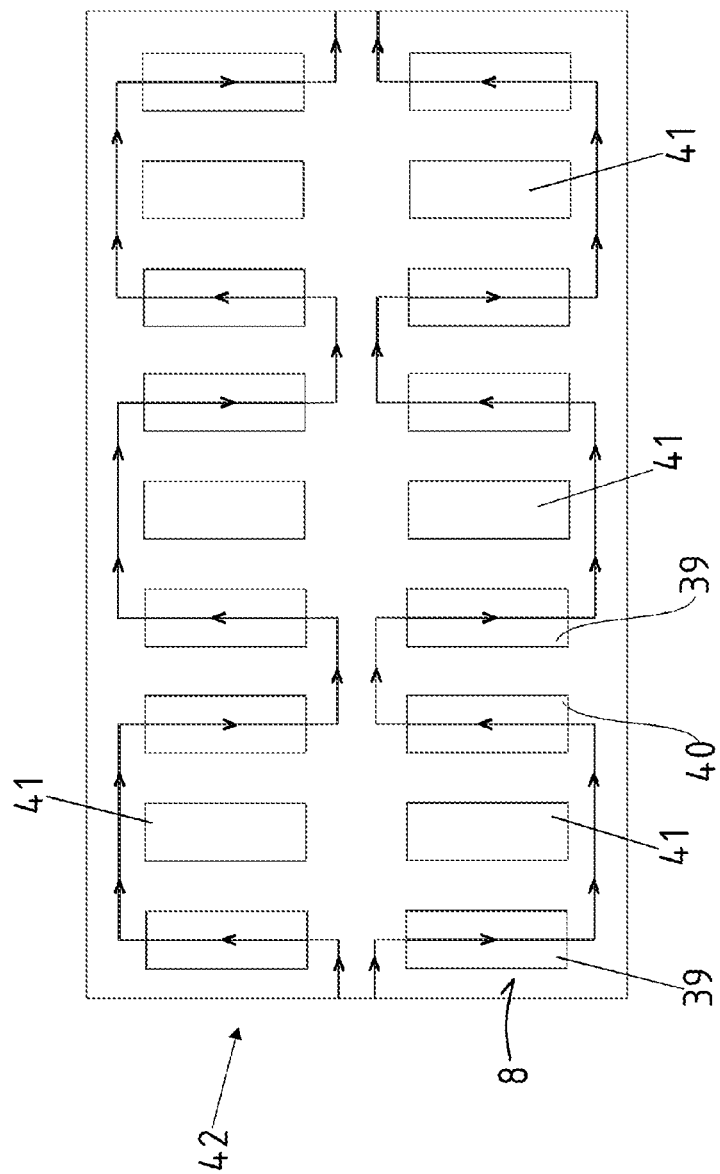
Figure 18:
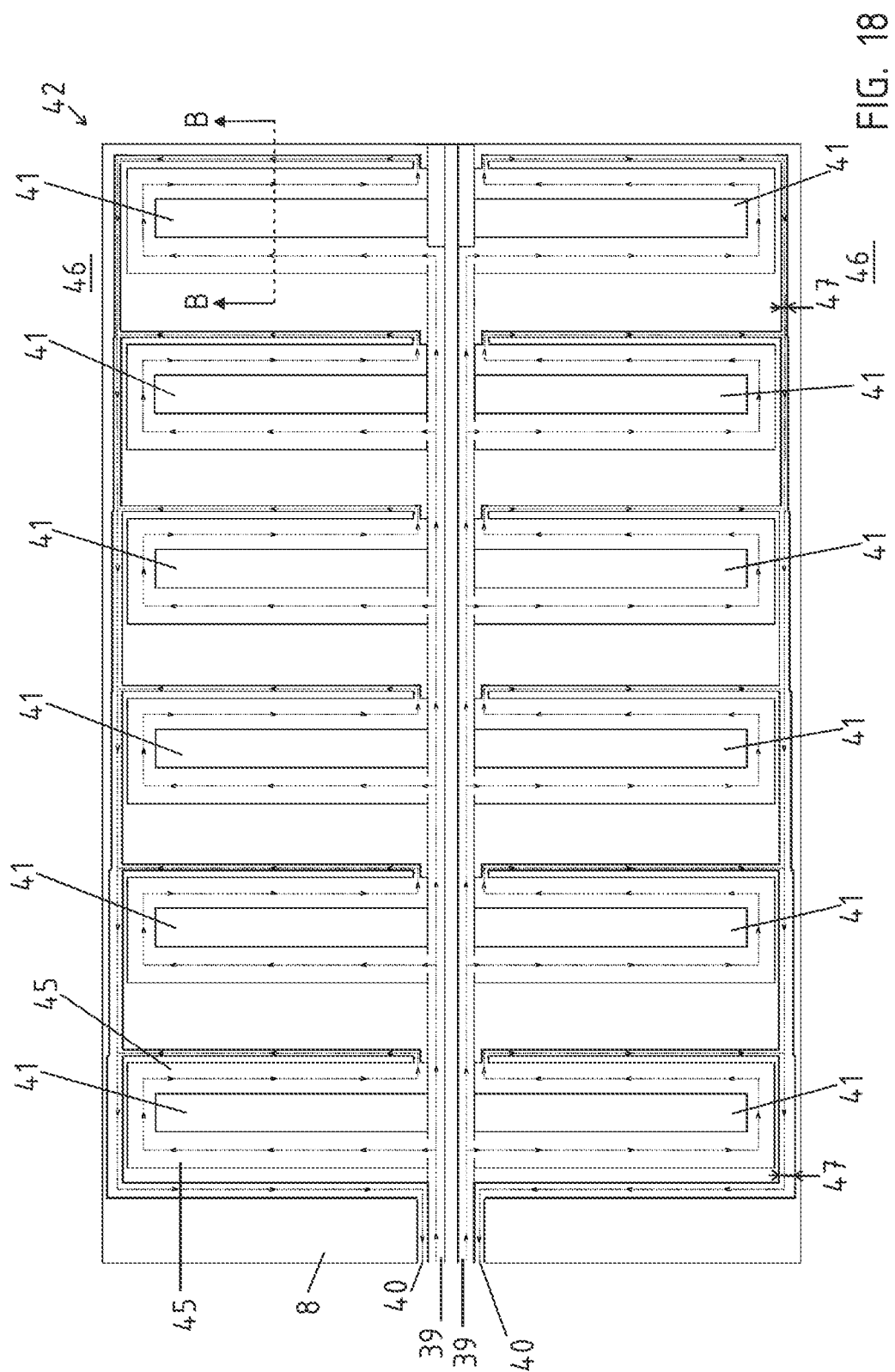
Figure 20:
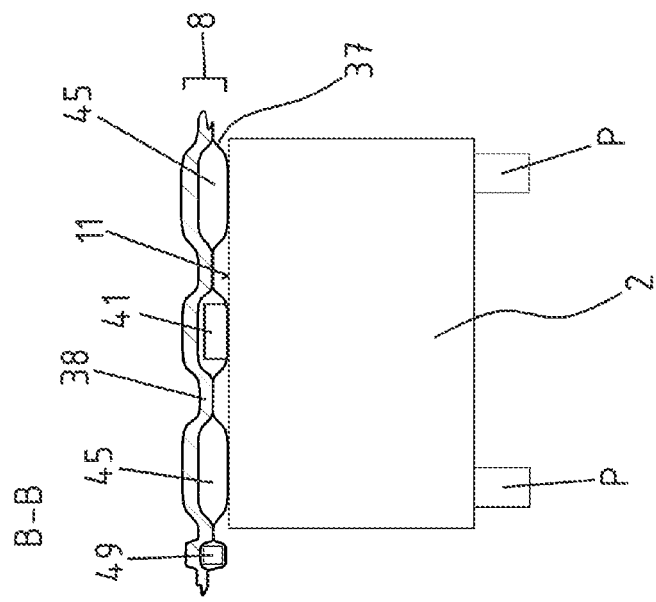
Figure 19:
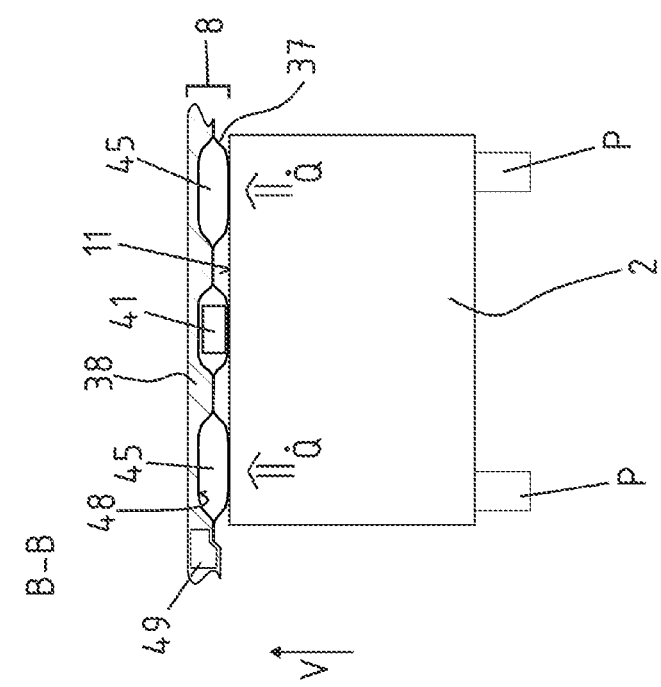
Figure 21A:
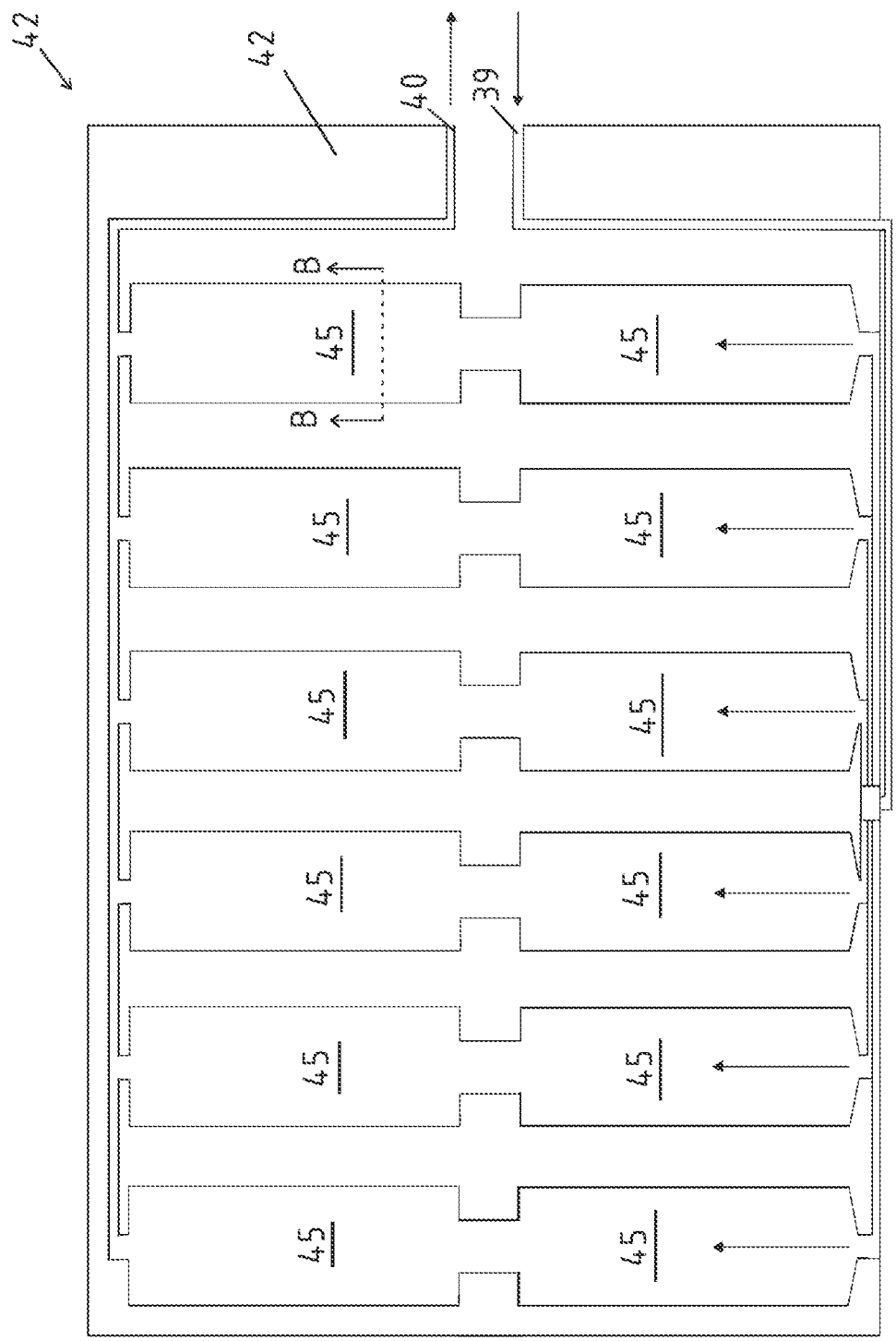
Figure 22:
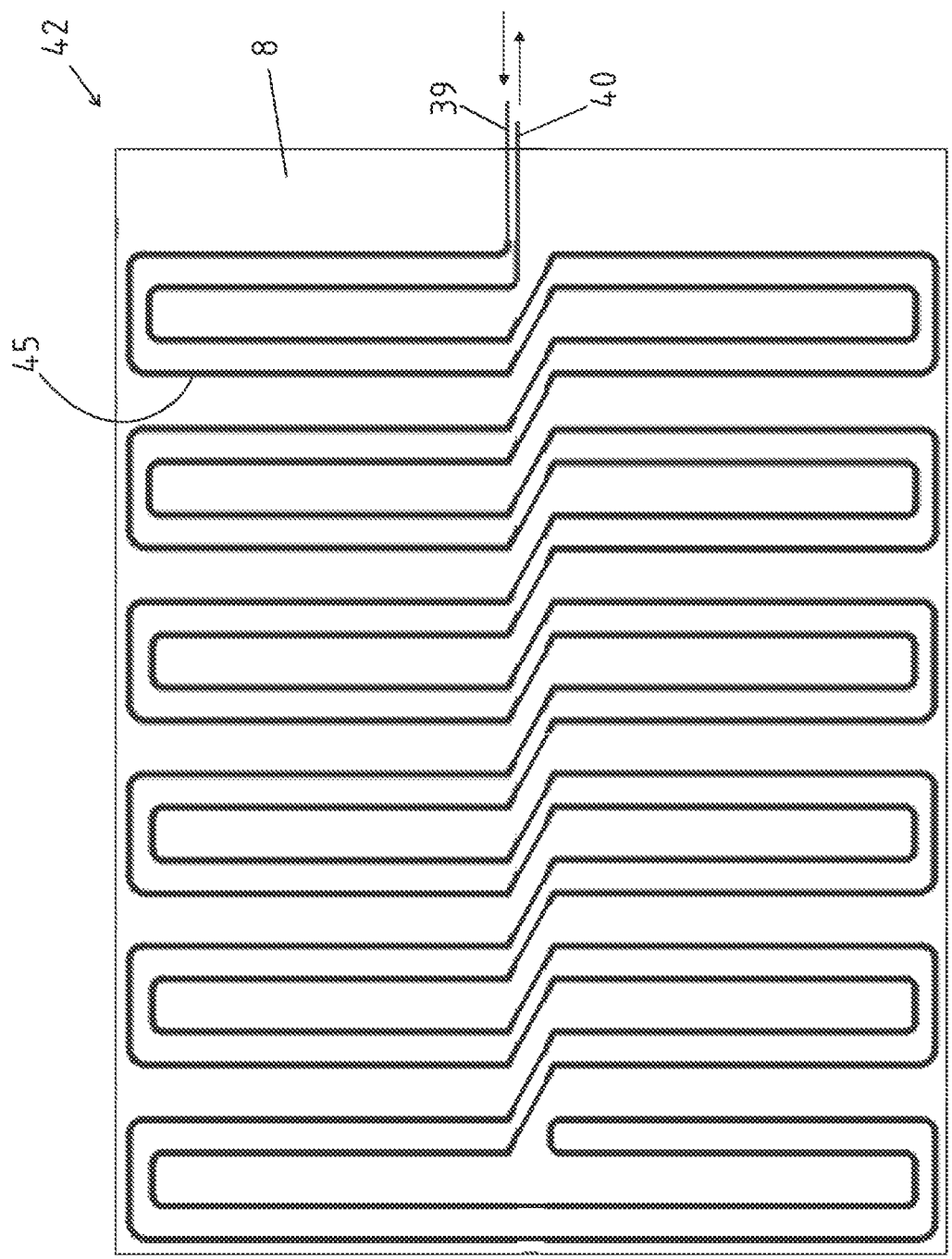

FIG. is 4 a battery holder according to an exemplary embodiment in the installed position in an electric vehicle;

FIG. 5 is a top view of a pan according to an exemplary embodiment;

FIG. 6 is a top view of the frame during its fabrication;

FIG. 7 is a method of fabrication of a frame according to an exemplary embodiment;

FIG. 8 is a cross section of a frame taken through a hollow profile;

FIG. 9 is a top view of the hollow profile during its fabrication;

FIG. 10 is a bent corner of a hollow profile;

FIG. 11 is a perspective view of two partitioning webs forming a receiving opening;

FIG. 12 is a cross sectional view of a battery holder according to one exemplary embodiment in the installed position in a motor vehicle with batteries;

FIG. 13 is a cross sectional view through a pan according to one exemplary embodiment with slanting inner wall;

FIG. 14 is a longitudinal sectional view through a battery holder with cooling system;

FIG. 15 is a partial longitudinal sectional view through a battery holder according to one exemplary embodiment with a cooling system;

FIG. 16 is a three-dimensional view of the bottom;

FIG. 17 is a top view of an exemplary embodiment of a cooling system;

FIG. 18 is a top view of a cooling system;

FIG. 19 is a detailed view taken along cross-sectioning line B-B of FIG. 18;

FIG. 20 is an alternative cross sectional view taken along line B-B of FIG. 18;

FIG. 21a is a top view of the cooling system in accordance with an exemplary embodiment;

FIG. 21b is cross sectional view of the cooling system in accordance with an exemplary embodiment; and FIG. 22 is a series-connected cooling system.

In the figures, the same or similar components have the same reference numbers, even if there is no repeat description for reasons of simplicity.

DETAILED DESCRIPTION OF SOME EMBODIMENTS

Some embodiments will be now described with reference to the Figures.

Figure 1:
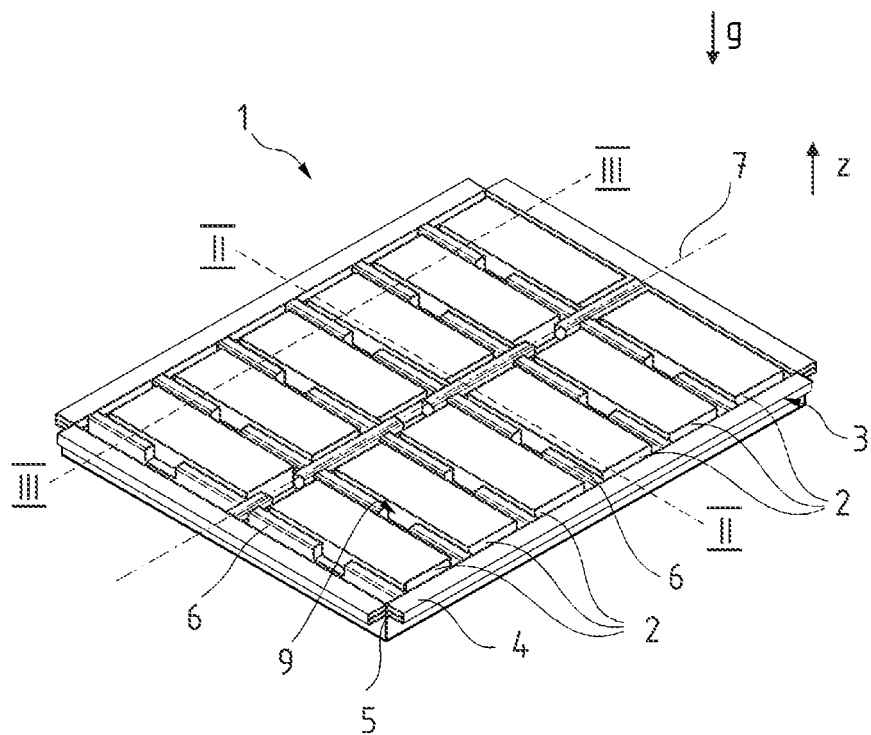
FIG. 1 is a perspective view of a battery holder in position for being outfitted with at least one battery according to one exemplary embodiment.

Referring to FIG. 1, a battery holder 1 in perspective view is illustrated. The battery holder 1 is in a position to be outfitted with at least one battery 2. The pan 3 is formed from an outer encircling frame 4, made from hollow profiles 5, as well as from a bottom, not visible in this representation. Inside the frame 4 are arranged individual partitioning webs 6, likewise preferably formed from hollow profiles 5. The partitioning webs 6 are preferably designed as mounting brackets. The battery holder 1 is then outfitted with at least one battery 2 in this position. Because of the force of gravity g, each of the batteries 2 lies against the bottom 8. They may be held by coupling to the bottom 8, for example by screws, or also alternatively or additionally by a clamping or snap fastening. Preferably, each battery 2 is coupled to the bottom 8 so as to form a bias force, so that each battery 2 lies sheetlike against the bottom 8. Once the outfitting is completed, the battery holder 1 is rotated by around 180 degrees about a center longitudinal axis 7. The opening 9 of the pan 3 then no longer points upward in regard to the motor vehicle's vertical direction Z, as was the case when being outfitted with at least one battery 2, but instead downward.

Referring now to FIGS. 2 and 3, cross-sectional and longitudinal views of the battery holder 1 are shown with the opening 9 pointing downward. On the outside, the encircling frame 4 with the hollow profiles 5 is respectively arranged. The frame 4 is coupled at its circumference to a bottom 8, especially in fluid-tight manner inside the pan 3 formed by the frame 4 and the bottom 8 is arranged at least one battery 2. An opening 9 of the pan 3 now points downward with respect to the motor vehicle's vertical direction Z. The battery holder 1 thus finds itself with the at least one battery 2 arranged therein in a position for installation in the electric vehicle. For this, the battery 2 for example can be joined by the graphically indicated screws 10 to the bottom 8, the frame 4, and/or the partitioning webs 6. A battery bottom 11 is thereby in sheetlike contact with the bottom 8 lying against it, so that an increased surface pressure results.

The opening 9 is closed by a two-layer cover 12, so that an interior 13 of the battery holder 1, in which also at least one battery 2 is arranged, is bounded off from the surroundings U. More specifically, the cover 12 and the pan 3 are coupled together in fluid-tight manner. An outer layer 14 has an arched structure or honeycomb structure. In particular, this creates an increased stiffness, also for the cover 12, in a thrusting direction S. The actual cover 12 can be formed for example by a metal sheet or also a sheet of fiber composite. This is strengthened in particular by the layer of the arched structure. Between the cover 12 and the at least one battery 2 is arranged an electrical conduction system 50. This electrical conduction system 50 is preferably clamped by a pressing force between cover 12 and battery 2 such that the electrically conductive contacts lie against the poles of the batteries 2.

Referring to FIG. 3, a longitudinal section along line III-III of FIG. 1, likewise in an installation situation inside the electric vehicle is illustrated. The individual partitioning webs 6 as well as the outer encircling frame 4, formed from the hollow profiles 5, are well seen, as is the cover 12 with the outer layer 14 with the arched structure. Cooling ducts 15 are provided above the bottom 8 with respect to the motor vehicle's vertical direction Z in the installed condition. A thermal conduction occurs across the battery bottom 11 to the bottom 8 and finally the heat is carried away by the cooling ducts 15. Moreover, a subfloor region 16 of a motor vehicle body is indicated, in which the battery holder 1 is arranged. The subfloor region 16 is located at the height of the motor vehicle wheels 17, and the cooling ducts 15 are then located between an interior 18 of the motor vehicle and the battery holder 1. A heating of the interior 18 can be prevented by the cooling ducts 15 above the bottom 8.

Figure 4:
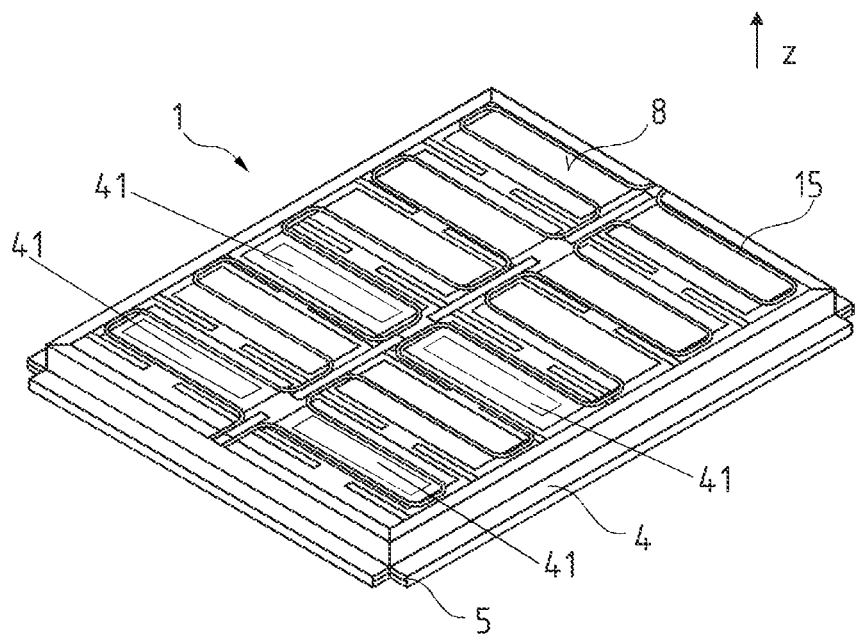

Referring to FIG. 4, the battery holder 1 is illustrated in a perspective view. The battery holder 1 here is represented in the installation position in the electric vehicle. The encircling frame 4 is formed by the hollow profiles 5. These are coupled to the bottom 8. In the installation position, a system of cooling ducts 15 is arranged above the bottom 8. Optionally, latent heat storages 41 can be arranged on or in the bottom 8. These are in particular sheetlike in form.

Referring to FIG. 5, a top view of the pan 3 of the battery holder 1 from above is illustrated. A battery 2 has been installed between the partitioning webs 6, which are formed as transverse webs 19 and a longitudinal web 20, each time producing a receiving space 21 to hold a respective battery 2. The transverse webs 19 and longitudinal webs 20 are coupled in particular to the frame 4 in the pan 3, since the bottom 8 itself has a lesser load-bearing function. Preferably, they are coupled to an inner wall 22, and in the most simple variant embodiment they can be thermally joined. However, it is also conceivable for the inner wall 22 itself to run at an angle, for example, tapering inward in the direction of the bottom 8. The partitioning webs 6 may then be arranged as a wedge mounting and be fastened here in the frame 4 especially by a force locking. In addition, detent lugs or spring webs are then formed, so that in particular in addition to the wedge-shaped mounting there is also a form-fitting by means of force locking. During the mounting process, the partitioning webs 6 can then be inserted into the pan 3. This is depicted in FIG. 13. The inner wall 22 is inclined to the bottom at an angle α larger than 90 degrees. Preferably, the hollow profile 5 can already be extruded in this shape with inner wall 22 inclined to the outer wall 30.

Furthermore, it can be seen that at least one transverse web 19 and at least one longitudinal web 20 intersect. It can be seen from FIGS. 2 and 3 that a height H19 of the transverse webs 19 and a height H20 of the longitudinal web 20 corresponds substantially to a height H13 of the interior 13 of the battery holder 1. The transverse webs 19 and the longitudinal web 20 are provided with recesses, so that they can be inserted into one another in cross-shaped manner on the principle of a tongue and groove system.

Referring to FIG. 6 a respective top view of a frame 4 is shown. The frame 4 is a single encircling piece of rectangular configuration. At its corners 23 it is produced by bending. On one short side of the rectangle as per FIG. 6, two end faces 24 butt together, and it is possible to couple them in an integrated material connection. Such an abutment can also be produced at one corner 23.

Referring to FIG. 7, a top view of a variant embodiment in which the frame 4 is formed by two frame pieces 25 which are U-shaped is illustrated. These come to bear at end faces 24 and can be coupled together, here by integrated material joining.

For the making of the frame 4, moreover, according to FIG. 8, a hollow profile 5 which is L-shaped in cross section is produced. A shorter web 26 points outward in the installed condition. The longer web 27 of the L-shape forms the outer encircling frame 4 and the inner wall 22, as well as the outer wall 30. The hollow profile 5 has a bottom 8 coupled to this. The bottom 8 has a wall thickness W8, which is preferably less than 3 mm, especially less than 1.5 mm. The bottom 8 in particular is made of light metal. The fabricated battery holder 1 can be coupled to the shorter web 26 for example by means of screws in a motor vehicle. This also achieves better rigidity of the frame, especially in the thrust direction S as per FIG. 3. To make the hollow profile 5, at first an endless extrusion is produced. This is provided with a 90-degree milling 28 at an inner side, i.e., at the inner wall 22 being formed, and with a dividing slot 29 on an outer side. This is shown in FIG. 9.

Referring to FIG. 10, the hollow profile 5 is bent by 90 degrees to form a corner 23 of the frame 4. An outer encircling outer wall 30 of the frame 4 thus has no dividing site and in particular it is fluid-tight. End faces lying against each other may be coupled together for example by integral material bonding across a thermal joint seam 31.

Referring to FIG. 11, a detailed view of the partitioning webs 6 is illustrated. A transverse web 19 abuts by its end face against the longitudinal web 20. The longitudinal web 20 and transverse web 19 can also be inserted into one another in cross shape. On one side wall 35 of the longitudinal web 20 there is an upwardly bent first flange 32 in terms of the vertical direction V. A second flange 33 is bent from a side wall 35 to the side of the transverse web 19. The two flanges 32 and 33 are each coupled together by a thermal joint seam 31. A seat 34 is provided for example with a rivet nut or a weld nut. Thus, as shown in FIG. 12, a screw 10 can reach through the battery 2 and be coupled in the seat 34. The battery 2 can thus be arranged in the particular receiving space 21. Between the upper flange 31 and the battery 2 there remains a free space 36, so that the battery bottom 11 can be pressed with a surface pressure against the bottom 8 by tightening the screw connection. Therefore, optimal heat conduction from battery 2 to the bottom 8 is achieved. The battery 2 in the installed position of the battery holder 1 thus hangs down in relation to the vertical direction Z of the motor vehicle. The battery 2 hangs pointing downward with its electrical poles P in the installation position of the battery holder 1 and in regard to the direction of the motor vehicle.

Referring to FIG. 12, the bottom is coupled fluid-tight to the encircling frame 4 in the coupling region K. At least the inner, i.e., the first bottom layer 37 described below is coupled fluid-tight to the frame 4. Thus, coolant escaping from the cooling system cannot get into the interior. The batteries are thus protected.

Preferably, the second bottom layer 38 is at least twice as thick in relation to the first bottom layer 37. The first bottom layer 37 preferably has a wall thickness which is less than 1 mm.

Referring to FIG. 13, a cross-sectional view of the pan 3 of the battery holder is illustrated in accordance with one exemplary embodiment. The frame 4 is formed from a hollow profile. An inner wall 22 of the frame 4 is situated at an angle α greater than 90 degrees to the bottom 8. Preferably, the angle α is between 90 degrees and 100 degrees. Thanks to the angled disposition of the inner wall 22, the partitioning webs can be inserted from above into the pan 3 in form-fitting manner, especially by wedging, as regards the vertical direction V. These partitioning webs may then be secured in position in the pan 3 for example by a detent connection, a glued connection, a welded connection or else a screw connection, not otherwise represented.

Referring to FIGS. 14 and 15, the bottom 8 is not only formed as a single layer, but also a double layer. It has a first bottom layer 37, which together with the encircling frame 4 of the hollow profiles 5 forms the pan 3. Each battery 2 is secured by its battery bottom 11 lying against the first bottom layer 37. Now a second bottom layer 38 is put in place. Between the first bottom layer 37 and the second bottom layer 38 there is formed a cooling system 42. In this embodiment, the cooling ducts 45 in the form of a respective inlet flow 39 and return flow 40 are formed between the first bottom layer 37 and second bottom layer 38. Moreover, a latent heat storage 41 is arranged. A coolant not otherwise represented thus flows through the inlet flow 39 across the first bottom layer 37, during which a quantity of heat $\dot{Q}$ is transmitted from the battery bottom 11 across the first bottom layers 37 by thermal conduction and then carried away by the not otherwise represented coolant.

At the same time, the latent heat storage 41 arranged between the bottom layers 37, 38 and also between the cooling ducts 45 at each inlet flow 39 and return flow 40 is likewise heated. Upon switching off or upon failure of the active cooling system 42, an additional quantity of heat $\dot{Q}_L$ can additionally be carried away from the battery 2 in the latent heat storage 41. During a cold start, on the other hand, a correspondingly stored quantity of heat $\dot{Q}$ of the latent heat storage 41 would ensure a preheating of the battery 2.

The second or outer bottom layer 38 is oriented toward a subfloor region 16 of a motor vehicle. An unwanted riding over or contacting of an obstacle or an object on a road surface 43 would still mean a deforming of the cover 12, but no damage to the cooling system 42 arranged above the battery holder.

The second bottom layer 38 is formed as a profiled metal sheet or honeycomb or corrugated sheet, so that the cooling ducts 45 are formed in a form-fitting and preferably fluid-tight coupling to the first bottom layer 37. It is also conceivable for the first bottom layer 37 to have a three-dimensional profiling. Alternatively, it is conceivable for a third bottom layer 44, shown more closely in FIG. 16, to be arranged between the first bottom layer 37 and second bottom layer 38. The first bottom layer 37 would then form the actual bottom of the pan 3. This is shown in FIG. 16. This represents a third bottom layer 44. The third bottom layer is incorporated between the first and the second bottom layer 37, 38. The cooling ducts 45 are then formed between the second bottom layer 38 and third bottom layer 44. The individual bottom layers 37, 38, 44 can be joined together by screws and/or adhesive and/or welding or soldering.

For the protection of the batteries 2, it is important that at least a first bottom layer 37 is connected fluid-tight to the frame 4, especially by an integrated material connection not shown here. Thus, escaping coolant does not get into the interior of the battery holder. FIG. 17 shows as an example a cooling system 42 in top view. The coolant flows here serially through the cooling ducts. A parallel connection of the cooling ducts 45 would also be conceivable.

Referring to FIG. 18, a top view of a cooling system 42 in accordance with on exemplary embodiment is illustrated. The cooling system 42 at the same time forms the bottom 8. Beneath the cooling system 42 in regard to the plane of the drawing are arranged the respective battery bottoms of the batteries lying against the cooling system. The cooling system 42 has an inlet flow 39 as well as a corresponding return flow 40. A cooling duct 45 is then formed for each battery 2, through which ducts the coolant flows from the inlet flow 39 to the return flow 40. The cooling duct 45 is arranged in U-shape in each case and flows in the longitudinal direction of a respective battery bottom. Arranged in or between the respective cooling duct 45 is a sheetlike elongated latent heat storage 41. The return flow has a cross section 47 increasing from right to left in the plane of the drawing on a respective outer side 46 of the cooling system 42.

Referring to FIGS. 19 and 20, each figure shows a cross section along line B-B of FIG. 18. A battery 2 is represented, whose battery bottom 11 lies against the inner bottom layer, i.e., the first bottom layer 37. The first bottom layer 37 is formed as a preferably thin sheet metal component, especially a thin light metal component. This can be formed as a profiled sheet, as shown here in FIGS. 19 and 20. However, the first bottom layer 37 can also be formed as a flat metal sheet, at least in the region of the battery 2. In order to form the cooling ducts 45 arranged between the first bottom layer 37 and second bottom layer 38, a second bottom layer 38, i.e., the outer bottom layer, is then coupled fluid-tight to the first bottom layer 37. According to FIG. 19, the second bottom layer 38 has grooves. For this, for example, the second bottom layer 38 can be formed from a plastic material, especially as an extruded component. For example, a fiberglass-reinforced thermoplastic can be used here. The grooves 48 may also be machined in.

According to FIG. 20, the second bottom layer 38, i.e., the outer bottom layer, is formed as a thick-walled sheet metal component and thus preferably as a profiled component. The respective cooling duct 45 or receiving space for the latent heat storage 41 can then also be formed here between the first bottom layer 37 and the second bottom layer 38.

Optionally, a thermally conductive layer such as a thermally conductive paste or the like can further be arranged between the first bottom layer 37 and the battery bottom 11, so that the thermal transfer from the battery 2 to the cooling ducts 45 of the cooling system 42 or the latent heat storage 41 is improved by virtue of thermal conduction. Each time a return duct 49 is arranged optionally at the side. The return duct 49 can then take the coolant carried through the cooling ducts 45 back to the return flow 40. The coolant can also be a heat transfer fluid, so that it can also take on a heating function.

The batteries 2 hang with their electrical poles P pointing downward in the vertical direction V on the bottom 8 or in the battery holder. Thus, a further benefit of the invention is that the quantity of heat Q̇ given off by the battery 2 is taken upward in the vertical direction V and the cold produced by the cooling ducts 45 is taken downward in the vertical direction. Thus, in the event that the second bottom layer 38 is made of a plastic material or a thick-walled material, a better insulating action occurs in the direction of the passenger compartment situated above it, and not otherwise represented. FIGS. 21a and b show an alternative variant embodiment of a cooling system 42, where FIG. 21b is a cross section along line B-B of FIG. 21a. Here as well, the cooling system 45 is formed with an inlet flow 39 and a return flow 40.

The height H45 of the cooling duct 45 is preferably between 1 mm and 5 mm, especially between 1.4 mm and 1.6 mm. The cooling ducts 45, which extend here substantially parallel to the battery bottom 11, are sheetlike in form. Once again, a first bottom layer and a second bottom layer 38 are formed, which may be designed for example as a profiled sheet metal component. Then, the respective sheet-like cooling duct 45 is produced between the first bottom layer 37 and the second bottom layer 38. The battery bottom 11 lies against the first bottom layer 37. A corresponding quantity of heat Q̇ emerging from the battery 2 is conducted across the first bottom layer 37 into the cooling duct 45 and taken away by the coolant. Thanks to the sheetlike form of the respective cooling duct 45, this may also be used as a latent heat storage, in which the coolant no longer flows through the cooling duct 45, but rather stays therein. A heating function can also be performed, so that when starting the electric vehicle the coolant at first has a higher temperature and gives off corresponding heat to the batteries 2. For example, the batteries 2 can also be preheated before starting the electric vehicle.

FIG. 22 shows another exemplary embodiment of the cooling system 42 forming the bottom. Here as well, an inlet flow 39 and a return flow 40 are provided. The cooling ducts 45 are tubular in shape, for example, and connected in series, distributed over the entire bottom 8. A coolant thus flows through a coil or a coil-like structure integrated in the bottom. The coils of the inlet flow 39 and return flow 40 are each arranged in a U-shape along the side of the bottom opposite the battery bottom, so that a quantity of heat given off accordingly by the batteries can be carried away.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A battery holder for an electric vehicle, comprising:
   a pan;
   a cover;
   wherein the pan is formed by an outer encircling frame and a double-layered bottom; and,
   a cooling system integrated in the bottom of the pan, and wherein the cooling system is formed by the bottom layers.

2. The battery holder according to claim 1, wherein the frame is formed from a hollow profile.

3. The battery holder according to claim 1, wherein cooling ducts are formed between the two bottom layers to carry a heat transfer fluid.

4. The battery holder according to claim 1, wherein the cooling system can operate as a heating system by reversal of the heat flux.

5. The battery holder according to claim 1, wherein latent heat storages are arranged in the bottom.

6. The battery holder according to claim 5, wherein the latent heat storages are arranged between the cooling ducts.

7. The battery holder according to claim 1, wherein at least one bottom layer is formed from a metallic material, preferably the two bottom layers are formed from a metallic material.

8. The battery holder according to claim 1, wherein at least one bottom layer is formed from a fiber composite and/or a plastic material.

9. The battery holder according to claim 1, wherein the first bottom layer facing the batteries is made from a light metal.

10. The battery holder according to claim 1, wherein at least one battery lies in sheetlike manner with a bias force against the bottom.

11. The battery holder according to claim 1, the bottom layers are coupled to each other in integrally bonded and/or form-fitting manner.

12. The battery holder according to claim 1, wherein the battery holder is mounted in a subfloor region of an electric vehicle.

13. The battery holder according to claim 2, wherein the hollow profile is a multichambered hollow profile.

14. The battery holder according to claim 2, further comprising at least one transverse web and at least one longitudinal web are arranged in the frame.

15. The battery holder according to claim 9, wherein the light metal is an aluminum alloy.

16. The battery holder according to claim 11, wherein the coupled comprises being joined together by adhesive and/or screws.

\* \* \* \* \*